United States Patent [19]

Kawada et al.

[11] 4,207,504
[45] Jun. 10, 1980

[54] SPINDLE CONTROL SYSTEM

[75] Inventors: Shigeki Kawada; Yoshiki Fujioka, both of Hino; Mitsuhiko Hirota, Tokyo, all of Japan

[73] Assignee: Fujitsu Fanuc Limited, Tokyo, Japan

[21] Appl. No.: 940,334

[22] Filed: Sep. 7, 1978

[30] Foreign Application Priority Data

Sep. 8, 1977 [JP] Japan .................................. 52-108665

[51] Int. Cl.² .......................................... G05B 13/00
[52] U.S. Cl. .................................... 318/561; 318/590; 318/616
[58] Field of Search ............... 318/590, 561, 611, 615, 318/616, 617, 618

[56] References Cited

U.S. PATENT DOCUMENTS

| | | | |
|---|---|---|---|
| 3,412,300 | 11/1968 | Westenskow | 318/618 |
| 4,099,112 | 7/1978 | Klinger | 318/561 |

FOREIGN PATENT DOCUMENTS 1440335  6/1976  United Kingdom .................... 318/590

Primary Examiner—J. V. Truhe
Assistant Examiner—Eugene S. Indyk
Attorney, Agent, or Firm—Staas and Halsey

[57] ABSTRACT

A speed detector produces a spindle speed signal proportional to the revolving speed of a spindle. A specified position detector provides a specified position signal when the spindle assumes a specified rotational position. A spindle motor speed control unit controls the spindle motor so that the motor speed agrees with a speed command. When spindle orientation is requested, one integrator circuit responds to the specified position signal to integrate the spindle speed signal. The output from the integrator circuit is applied to the speed control unit in place of the speed command.

1 Claim, 2 Drawing Figures

SPINDLE CONTROL SYSTEM

BACKGROUND OF THE INVENTION

1. Field of the Invention

This invention relates to a spindle control system which is capable of orientation of the spindle of a machine tool or the like.

2. Description of the Prior Art

With conventional spindle control systems, the spindle can be controlled by a spindle motor control circuit to agree with an arbitrary commanded speed, but to stop the spindle at its specified rotational position for an ATC (Automatic Tool Change) operation, it is necessary to provide a position control circuit including a special position detector, for example, a resolver, position coder or like expensive detector.

SUMMARY OF THE INVENTION

This invention has for its object to provide a spindle control system which is capable of orientation of the spindle by the employment of an inexpensive circuit structure without involving the use of such an expensive position detector as employed in the prior art.

Briefly stated, this invention employs an integrator circuit for integrating a spindle speed signal and a specified spindle position detector, and in the case of spindle orientation, the integrator circuit is actuated in response to a specified position signal from the specified spindle position detector to integrate the spindle speed signal, thereby obtaining a command for the spindle motor.

DESCRIPTION OF THE PREFERRED EMBODIMENTS

Figure 1:
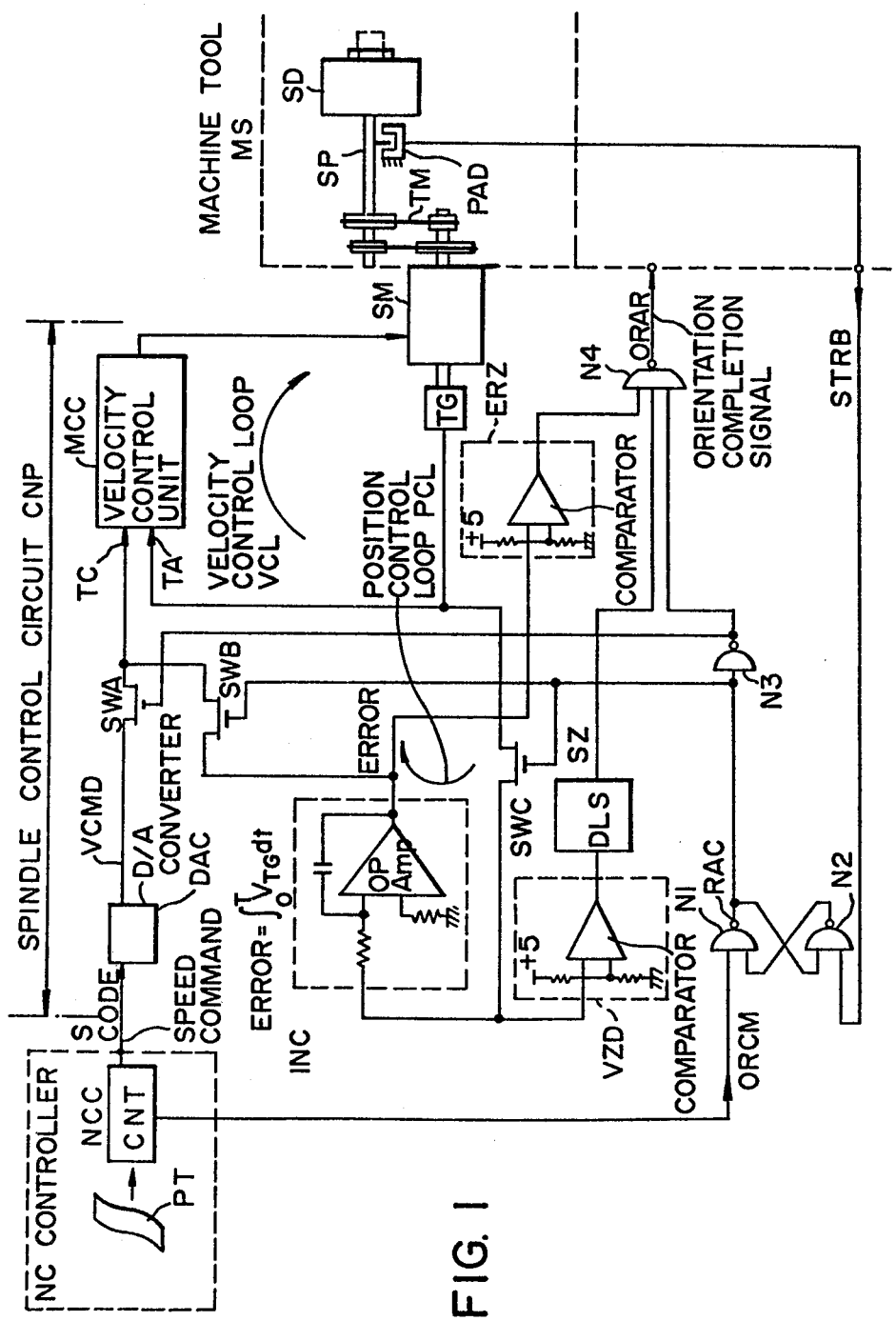
FIG. 1 is a block diagram illustrating an embodiment of this invention.
Figure 2:
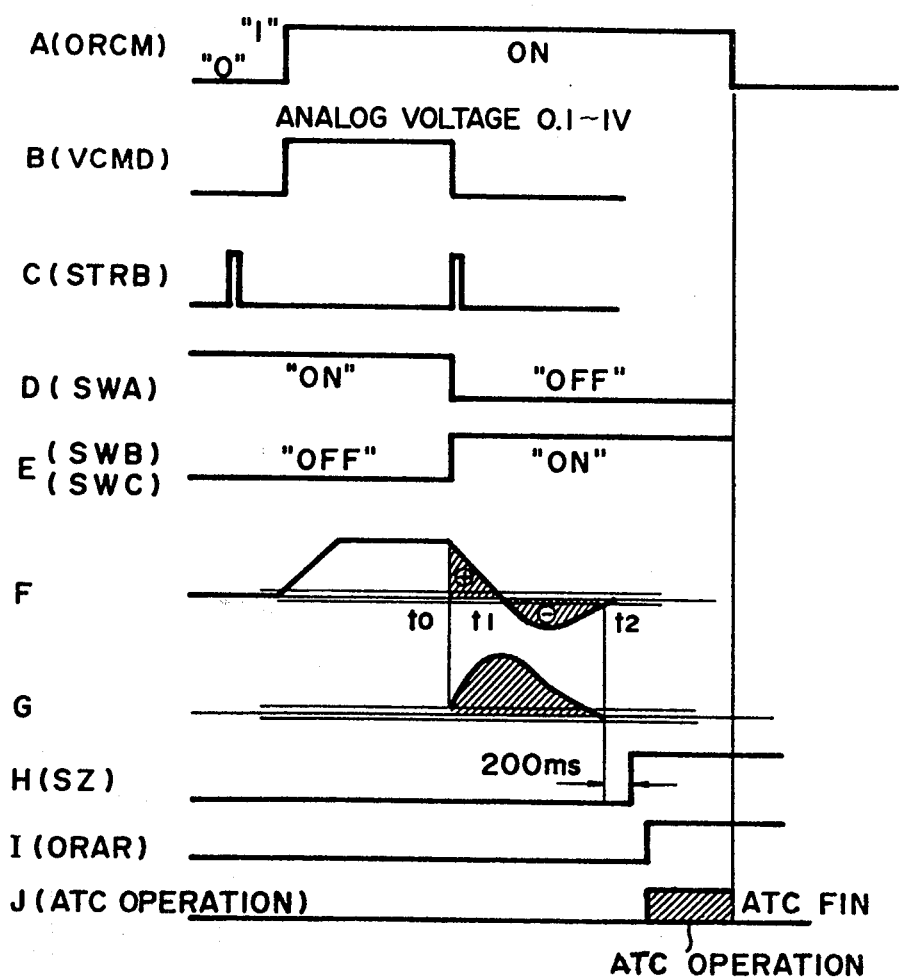
FIG. 2 shows a series of timing charts of signals in the embodiment of FIG. 1.

FIG. 1 shows in block form a spindle control system embodying this invention, and FIG. 2 shows a series of timing charts of respective parts of the spindle control system.

The block diagram of the control system depicted in FIG. 1 includes a numeric controller NCC, a spindle control circuit CNP and a machine tool MS.

The machine tool MS includes a spindle head stock SD provided with a spindle SP and a DC spindle motor SM, which motor drives the spindle SP through a transmission mechanism TM. The spindle SP has a specified rotational position detector PAD composed of a proximity switch in accordance with this invention. The proximity switch itself is known in the art and adapted to provide a detecting signal STRB each time a magnetic piece fixed to the spindle SP passes through a detecting part disposed opposite the spindle SP. That is, one detection signal STRB is generated at a specified rotational position of the spindle SP for each rotation thereof.

The numeric controller NCC includes a numeric control command tape PT and a controller CNT. The command tape PT has recorded thereon an ordinary axes moving command and, as auxiliary functions, a spindle speed command and a spindle orientation command. The spindle speed command is provided as an S code command taking the form of a numerical value, which command is converted by a D-A converter DAC of the spindle control circuit CNP to a speed command signal VCMD of a voltage corresponding to the numerical value, thereafter being applied to a first input terminal TC of a speed control unit MCC composed of an SCR phase control circuit. The spindle motor SM has associated therewith a speed detector TG which comprises a tacho generator and produces a voltage signal proportional to the revolving speed of the spindle motor SM. The output voltage from the speed detector TG is applied as a speed feedback voltage to a second input TA of the speed control unit MCC. The speed control unit MCC controls a current to the DC spindle motor SM by controlling the firing angle of an SCR so that the feedback voltage to the terminal TA may agree with the command voltage applied to the terminal TC, as is well-known in the art. As a result of this, the speed of the spindle motor SM can be controlled to agree with the spindle speed command from the command tape PT.

In the present invention, some circuits are added to the spindle control circuit CNP for achieving the orientation of the spindle SP.

That is to say, an integrator circuit INC is provided for integrating the spindle motor speed detection signal. The integrator circuit INC, which includes an operational amplifier OP Amp, is known in the art. The integrator circuit INC has its input terminal connected via an analog switch SWC with the output terminal of the speed detector TG and its output terminal connected via an analog switch SWB with the input terminal TC of the speed control unit MCC. Between the D-A converter DAC and the input terminal TC of the speed control unit MCC is connected an analog switch SWA. These switches SWA, SWB and SWC can be controlled in response to the output from a latch circuit RAC. When the switch SWA is in the ON state and the switches SWB and SWC in the OFF state, the speed of the spindle motor SM is controlled to be equal to the speed command signal VCMD by a speed control loop VCL including the speed control unit MCC, the spindle motor SM and the speed detector TG.

Upon turning OFF the switch SWA and ON the switches SWB and SWC, the integrator circuit INC starts to integrate the output voltage from the speed detector TG, and the output voltage from the inregrator circuit INC is provided to the terminal TC of the speed control unit MCC in place of the speed command signal VCMD. The polarity of the output voltage from the integrator circuit INC is selected to be opposite to the polarity of the output voltage being derived from the speed detector TG at this time. The output voltage from the integrator circuit INC is representative of the amount of rotation of the output shaft of the spindle motor SP after turning ON of the switch SWC. This output voltage and the output voltage from the speed detector TG are respectively applied to the speed control unit MCC in the abovesaid relationship, and as a consequence, the output shaft of the spindle motor SM is controlled in such a manner that it overshoots by a certain angle the position where it assumed at the time of turning ON of the switches SWB and SWC, and then returns to the position to stop there.

The spindle orientation command ORCM issued via the controller CNT from the command tape PT is applied to one input of the latch circuit RAC comprised of NAND circuits N1 and N2, and the specified position signal STRB from the specified spindle rotational position detector PAD is applied to the other input of the latch circuit RAC. The spindle orientation command is predetermined to assume a logical value "1" in the case of achieving the spindle orientation and a logical value "0" in the other cases, and the specified position signal STRB is also predetermined to take a logical value "0" or "1" depending on whether or not the spindle is assuming its specified rotational position.

The output from the latch circuit RAC is provided to the switches SWB and SWC and, at the same time, to the switch SWA through a NAND circuit N3. The switches SWA through SWC are each turned ON by a control input of logic "0" and OFF by a control input of logic "1".

Accordingly, when the spindle orientation command ORCM is "0", that is, in the normal state, the output from the latch circuit RAC is "1" regardless of whether or not the specified position signal STRB is being applied thereto, and consequently only the switch SWA is in the ON state and the switches SWB and SWC in the OFF state. When the spindle orientation command ORCM becomes "1", the output from the latch circuit RAC is altered "0" by the specified position signal STRB obtained first, so that the switch SWA is turned OFF and the switches SWB and SWC are turned ON, enabling the aforesaid operation.

A NAND circuit N4 serves to provide an orientation end signal (an ATC enable signal) ORAR indicating completion of the spindle orientation. A first input of the NAND circuit N4 is supplied with the output from an error zero detector ERZ. The error zero detector ERZ produces logic "1" when the output from the integrator circuit INC is zero or below a predetermined allowed value.

To a second input of the NAND circuit N4 is applied the output from a zero speed detector VZD via a delay circuit DLS (200 ms). The zero speed detector VZD generates via the delay circuit DLS a zero speed signal SZ (logic "1") delayed for 200 ms when the spindle motor speed detecting signal becomes zero or below a predetermined allowed value.

To a third input of the NAND circuit N4 is applied the output from the NAND circuit N3.

As a consequence, when the spindle orientation command ORCM is given to cause the spindle motor SM, to shift from the speed control to the position control mode and then the spindle SP stops at its specified position, that is, when the output from the integrator circuit INC becomes zero, i.e. the spindle motor speed becomes zero, the NAND circuit N4 provides the orientation end signal ORAR (logic "0"), indicating that the ATC operation may be initiated.

FIG. 2 shows a series of timing charts of the respective parts of the embodiment depicted in FIG. 1. With reference to FIG. 2, the operation of the system of FIG. 1 will hereinafter be described.

In FIG. 2, A shows the spindle orientation command ORCM, B the orientation speed command VCMD, C the detection signal STRB, D the operation of the switch SWA, E the operations of the switches SWB and SWC, F the voltage representative of the spindle motor speed, G the output from the integrator circuit INC, H the zero speed signal SZ, I the orientation end signal ORAR and J the ATC operation.

Upon issuance of the spindle orientation command ORCM, the controller CNT applies a low speed command to the D-A converter DAC, and the orientation speed command VCMD becomes a predetermined low voltage, with the result that the spindle motor SM is driven at the orientation speed (a low speed). As shown in FIGS. 2C, D and E, by the arrival of the first specified spindle position signal STRB, the switch SWA is altered from the ON to the OFF state and the switches SWB and SWC from the OFF to the ON state at a moment t0.

Consequently, the integrator circuit INC starts to integrate the speed voltage indicative of the actual speed of the spindle motor SM, and the output voltage from the integrator circuit INC is applied to the speed control unit MCC in the polarity reverse from that of the output voltage which is derived from the speed detector TG at the moment t0.

As a result of this, while being reduced in speed, the spindle motor SM rotates in the same direction as that in which it has been driven until then, and finally stops at a moment t1, and the output from the integrator circuit INC reaches its maximum value. Consequently, the spindle motor SM starts to rotate in the reverse direction, and the output from the integrator circuit INC gradually decreases to be substantially zero at a moment t2. As the output from the integrator circuit INC decreases, the revolving speed of the spindle motor SM in the reverse direction is also gradually reduced to be substantially zero at the moment t2. Although the spindle motor SM may further repeat to reverse its direction of rotation depending on the circuit gain and the value of a load, it comes to rest finally at the position where the output voltage of the integrator circuit INC is reduced to zero. In the example of FIG. 2F, the spindle motor SM and the spindle SP overshoot the position of the first specified position signal STRB being obtained by an angle corresponding to the area of a region $\oplus$ and then rotate in the reverse direction through an angle corresponding to the area of a region $\ominus$ equal to that of the region $\oplus$ and finally stop at the position where the specified position signal STRB is obtained.

As illustrated in FIG. 2H, the zero speed signal SZ is produced a certain delay time (200 ms) after the moment when the spindle revolving speed becomes zero or below a predetermined value, and in response to this, the orientation end signal ORAR is obtained. Then the ATC operation is achieved, and by an ATC end signal, the spindle orientation command ORCM is removed.

While the proximity switch is employed as a specified rotational position detector in the above embodiment, it may also be replaced with an optical or contact-type switch. Further, this invention is also applicable to the case where the spindle SP and the output shaft of the spindle motor SM are formed as a unitary structure with each other.

As described above, the present invention enables it possible to control the spindle to stop at a specified rotational position only by adding a simple specified spindle rotational position detector and a simple integrator circuit, and has the advantage that the abovesaid control can be achieved by an inexpensive device without requiring such an expensive element as a resolver or a position coder.

It will be apparent that many modifications and variations may be effected without departing from the scope of the novel concepts of this invention.

What is claimed is:

1. A spindle control system in which a spindle motor for driving a spindle has associated therewith a speed detector for producing a speed detection signal proportional to the motor speed and the motor speed is controlled by the speed detection signal to agree with a predetermined speed command signal, said system comprising:
  a specified position detector for producing a specified position signal when the spindle assumes a specified rotational position during its rotation; and
  an integrator circuit for integrating the speed detection signal;
  wherein when to stop the spindle at a predetermined position, the integrator circuit is actuated in response to the specified position signal, and the output signal from the integrator circuit is used, in place of the speed command signal, to achieved positioning control of the spindle.

* * * * *

UNITED STATES PATENT AND TRADEMARK OFFICE
CERTIFICATE OF CORRECTION

PATENT NO. : 4,207,504

DATED : June 10, 1980

INVENTOR(S) : Shigeki Kawada et al

It is certified that error appears in the above—identified patent and that said Letters Patent are hereby corrected as shown below:

Column 2, line 46, "inregra-" should be --integra- --.

Column 4, line 43, after "Then" insert --,--.

Signed and Sealed this

Eighteenth Day of November 1980

[SEAL]

Attest:

Attesting Officer

SIDNEY A. DIAMOND

Commissioner of Patents and Trademarks